April 30, 1946.  W. H. HUNTER  2,399,186
SHIELD ASSEMBLY FOR AIRCRAFT
Filed Oct. 14, 1943
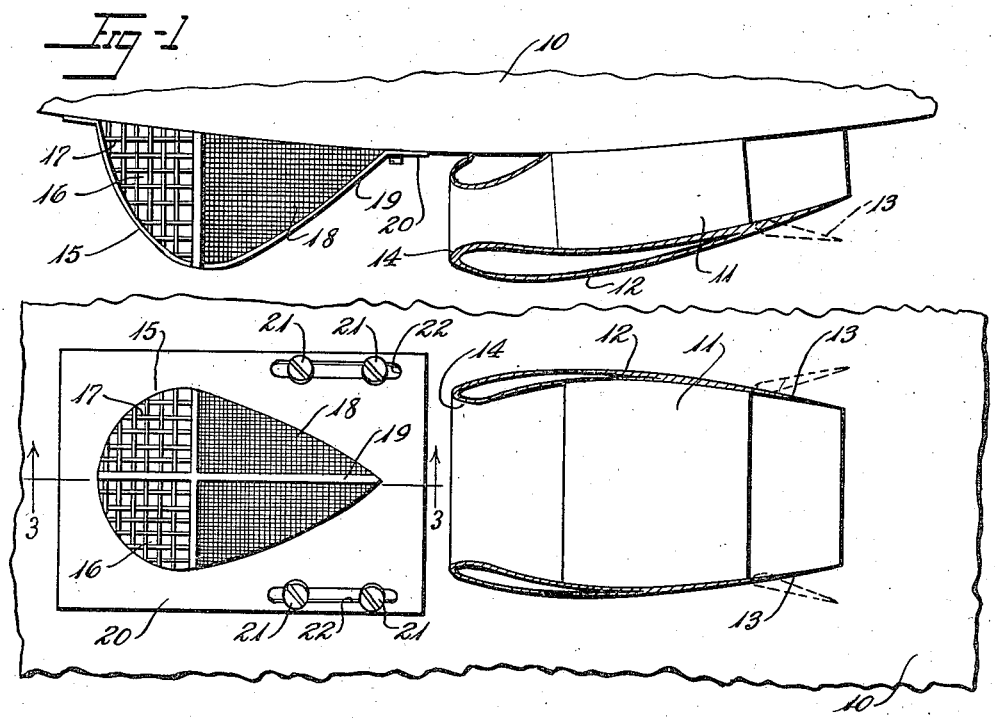
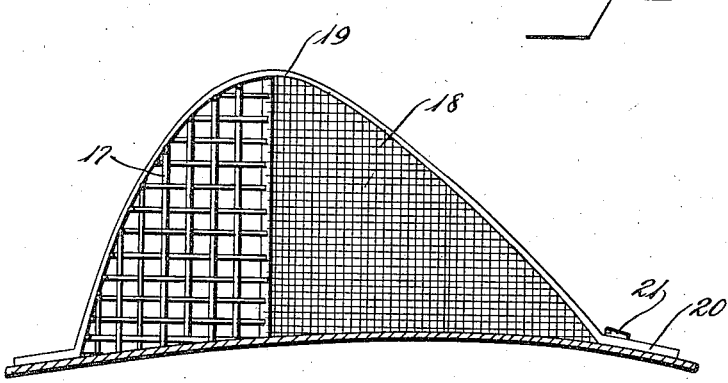
Inventor
Willson H. Hunter
By Willis F. Avery
Atty Patented Apr. 30, 1946

2,399,186

UNITED STATES PATENT OFFICE 2,399,186

SHIELD ASSEMBLY FOR AIRCRAFT

Willson H. Hunter, Akron, Ohio, assignor to The B. F. Goodrich Company, New York, N. Y., a corporation of New York Application October 14, 1943, Serial No. 506,158

4 Claims. (Cl. 183—51)

This invention relates to means for protecting parts of aircraft and other objects in air flow for preventing the accumulation of ice and other foreign matter thereon and is especially concerned with a shield assembly for minimizing accumulation of ice on air scoops such as radiator duct scoops and carburetor air intake scoops of aircraft.

Ice accumulation on air intake scoops has long presented a serious problem in the operation of aircraft through icing weather conditions. Ice tends to accumulate about the mouth of the scoop with attendant reduction in flow of air into the scoop. In some cases, and especially when vanes are provided in the scoop, ice may bridge across the mouth and cut off completely all flow of air into the scoop. Other foreign matter such as stones, leaves, and the like, also may be carried into the scoop by the air stream with objectionable consequences.

The present invention provides for minimizing the collection of ice on air scoops and the like without objectionally detracting from efficiency of the scoop in its function of taking in air. In this connection it is an object to make provision whereby ice and water and other particles are deflected or filtered out of the air stream or both in advance of the scoop, and whereby the particles are caused to build up a body for deflecting ice, water and other foreign matter from the mouth of the scoop while air is nevertheless directed into the scoop. A further object is to provide for utilizing perforate screening material in the most effective manner.

The invention will be described in greater detail with reference to the accompanying drawing of which:

Fig. 1 is a side elevation illustrating an installation of the invention in conjunction with the radiator air scoop duct of an aircraft, portions of the air scoop and duct being broken away and sectioned for clarity of illustration.

Fig. 2 is a bottom plan view of the structure shown in Fig. 1, the air scoop and duct again being broken away and sectioned for clarity of illustration.

Fig. 3 is a section taken along line 3—3 of Fig. 2.

In the drawing the invention is applied to an aircraft 10 having a radiator or other device 11 to which air is directed by the air scoop 12, flow of air through the scoop and radiator being controlled in the usual manner by exit control flaps 13, 13. The mouth 14 of the air scoop is protected by a shield assembly 15 of the invention, the shield being disposed in the air stream in advance of the air scoop mouth.

The shield assembly 15, in a preferred embodiment, comprises a bulbous hollow body 16 of streamlined configuration having a maximum width preferably slightly greater than the width of the mouth 14. The streamlined body 16 is formed with walls of pervious material such as metallic or other screen mesh wire. The frontal section of the body extending back as far as the zone of maximum width is formed of relatively coarse mesh screen 17 which will permit free passage of ice and water particles carried by the air stream as well as the air. The trailing section of the streamlined body extending from the zone of maximum width to the rearmost portion is formed of a relatively finer mesh screen material 18 which, while permitting free passage of air under normal conditions, will intercept and retain ice particles carried by the air stream and water particles capable of freezing thereon. As an illustrative though not limiting example of the sizes of mesh suitable for the purpose, the coarse mesh screen 17 may have openings of about one-half inch width, and the finer screen 18 may have a mesh comparable to that ordinarily used in fly screens on houses. The purposes and functions of the pervious screen wire walls will be described in greater detail hereinafter. The screen wire may be supported in any convenient manner as by a suitable metallic grid 19.

The screen wire and supporting grid may conveniently be welded or otherwise attached to a mounting flange 20 and secured to the fuselage of the aircraft by means of screws 21, 21 extending through slots 22, 22 in the flange, the slots and screws providing means for adjusting the spacing between the streamlined body 16 and the air scoop mouth 14 for most effective operation.

When the aircraft is flown through non-icing weather conditions, air flows through the pervious shield 15 and into the air scoop 12 without objectionable impairment of the flow by the shield.

When icing weather is encountered, air and ice and water particles continue to pass freely through the frontal, relatively coarse, screen 17 and the air likewise passes through the trailing, relatively fine, screen 18, but ice particles carried by the air stream and water ready for freezing on the fine screen are filtered out and retained on the fine screen 18 where a continuous coating builds up to block further flow through this screen.

After the fine mesh screen 18 has become fully blocked by ice within the shield, the shield functions more in the manner of an imperforate shield, and ice then may build out over the coarse mesh screen 17.

The period of time required for the ice to build up within the shield permits the shield to maintain its original fully streamlined shape, without modification by exterior ice, in many cases where the icing conditions are not too prolonged, and when the ice accumulates on the front of the shield. The formerly pervious body 16 then will have become non-pervious and will constitute a body departing from the fully streamlined shape only somewhat and serving to divide the advancing air stream and causing it to flow around the streamlined body and thence into the mouth 14. Flow of air to the scoop is, thus, not objectionably impeded by the shield even after it has become coated with ice. Particles of ice, water and other foreign matter carried by the air stream do not, however, travel with the air into the mouth of the scoop but, because of their inertia, such foreign particles tend to continue their travel outwardly and rearwardly from the streamlined shield without turning inwardly about its trailing rear portion as does the air stream which has less inertia. Furthermore, when flying through non-icing conditions, the body 16 serves mechanically to deflect stones, leaves, sticks, and similar foreign material and thus to prevent their entry into the scoop.

The invention achieves to a high degree the objects of minimizing entry of foreign material, particularly ice, in and about the mouth of air scoops while nevertheless permitting the entry of air efficiently into the scoops.

Variations may be made without departing from the scope of the invention as it is defined by the appended claims.

I claim:

1. A shield assembly for protecting an object in air flow, said shield assembly comprising a bulbous body disposed in advance of said object in a position to shield it and comprising a forward section and a rearward section, both sections being pervious and the forward section being more coarsely pervious than the rearward section.

2. A shield assembly as defined in claim 1 in which the bulbous body has a streamlined shape.

3. A shield assembly for protecting an object in air flow, said shield assembly comprising a bulbous body disposed in advance of said object in a position to shield it, a forward portion of said body being formed of relatively coarse mesh screen material and a rearward portion of the body being formed of relatively fine mesh screen material.

4. A shield assembly for protecting an object in air flow, said shield assembly comprising a streamlined body disposed in advance of said object at a position to shield it, the frontal section of the streamlined body comprising relatively coarse screen material and the trailing section comprising relatively fine mesh screen material.

WILLSON H. HUNTER.